(12) United States Patent
Schmid

(10) Patent No.: US 8,085,037 B2
(45) Date of Patent: Dec. 27, 2011

(54) METHOD AND DEVICE FOR MEASUREMENT OF THE POLE ORIENTATION ANGLE OF A MAGNETIC LEVITATION VEHICLE OF A MAGNETIC LEVITATION RAILROAD

(75) Inventor: Robert Schmid, Neunkirchen am Brand (DE)

(73) Assignee: Siemens Aktiengesellschaft, Munich (DE)

( * ) Notice: Subject to any disclaimer, the term of this patent is extended or adjusted under 35 U.S.C. 154(b) by 349 days.

(21) Appl. No.: 12/522,552

(22) PCT Filed: Jan. 7, 2008

(86) PCT No.: PCT/EP2008/050085
§ 371 (c)(1),
(2), (4) Date: Jul. 9, 2009

(87) PCT Pub. No.: WO2008/084024
PCT Pub. Date: Jul. 17, 2008

(65) Prior Publication Data
US 2010/0019763 A1 Jan. 28, 2010

(30) Foreign Application Priority Data
Jan. 9, 2007 (DE) .......................... 10 2007 001 479

(51) Int. Cl.
*G01B 7/14* (2006.01)
*B60L 13/06* (2006.01)

(52) U.S. Cl. ......... 324/207.26; 324/207.11; 324/207.22; 324/260; 104/284

(58) Field of Classification Search ............. 324/207.26, 324/207.11, 207.22, 260; 104/284
See application file for complete search history.

(56) References Cited

U.S. PATENT DOCUMENTS 6,827,022 B2 * 12/2004 van den Bergh et al. ..... 104/284
7,986,138 B2 * 7/2011 Schmid .................... 324/207.11
* cited by examiner

*Primary Examiner* — Reena Aurora
(74) *Attorney, Agent, or Firm* — Laurence A. Greenberg; Werner H. Stemer; Ralph E. Locher

(57) ABSTRACT

A method for measuring the pole position of a magnetic levitation vehicle in a magnetic levitation railway, wherein a supporting magnetic field is generated on the maglev vehicle as a result of a supporting magnetic current on the vehicle side being fed to at least one supporting magnet. The voltage in the stator on the track is measured and the pole position angle between a reference axis of the stator and a reference axis of the maglev vehicle is determined. The magnitude of the supporting magnetic current on the vehicle side and thus the supporting magnetic field is temporally modified and a voltage induced in the stator by the temporal modification of the magnitude of the supporting magnetic field is detected. The pole position angle is formed using the measured values for the induced voltage.

11 Claims, 3 Drawing Sheets

METHOD AND DEVICE FOR MEASUREMENT OF THE POLE ORIENTATION ANGLE OF A MAGNETIC LEVITATION VEHICLE OF A MAGNETIC LEVITATION RAILROAD

BACKGROUND OF THE INVENTION

Field of the Invention

The invention relates to a method for measurement of the pole orientation angle of a magnetic levitation vehicle of a magnetic levitation railroad in which a supporting magnetic field is produced on the magnetic levitation vehicle by feeding a vehicle-side supporting magnet current into at least one supporting magnet, and the voltage is measured on the trackside stator, and the pole orientation angle between a reference axis of the stator and a reference axis of the magnetic levitation vehicle is determined by means of the voltage measured values.

Pole orientation measurement devices for magnetic levitation vehicles for measurement of the pole orientation angle are used, for example, in the Transrapid.

In the case of Transrapid, a mixed incremental/absolute position-finding system is used, which makes use of reference marks and the slots on the trackside stator to determine the position of the magnetic levitation vehicle, at low speeds. The pole orientation information is obtained as the difference between an electrical and a mechanical angle from knowledge of the position of the traveling-field winding relative to the track and the phase angle of the stator currents. However, this already known method is linked, on the basis of this subtraction process, to one data transmission channel, which has a real-time capability to a major extent, from the vehicle to the fixed-position drive control system.

At higher speeds in the case of Transrapid, the pole wheel voltage which is induced in the trackside stator by the supporting magnetic field of the moving magnetic levitation vehicle is observed. For this purpose, currents and voltages are measured at the connections of the trackside stator and therefore at the output of the drive converter, and are supplied to a mathematical model of the drive system. This so-called "up method" is highly suitable for relatively high speeds, but is dependent on the magnetic levitation vehicle traveling at a minimum speed, because the voltages induced in the trackside stator are otherwise too small for evaluation.

BRIEF SUMMARY OF THE INVENTION

Against this background, the invention is based on the object of specifying a method for measurement of the pole orientation of a magnetic levitation vehicle, which provides very good measurement results even when the vehicle speed is low or the vehicle is stationary, and which can nevertheless be carried out easily and at low cost.

According to the invention, this object is achieved by a method having the features as claimed in claim 1. Advantageous refinements of the invention are specified in the dependent claims.

The invention accordingly provides that the magnitude of the vehicle-side supporting magnet current and thus the supporting magnetic field is varied over time, and a voltage which is induced by the rate of change of the magnitude of the supporting magnetic field in the stator is detected, and the pole orientation angle is formed by means of the voltage measured values of the induced voltage.

By way of example, the rate of change of the magnitude of the vehicle-side supporting magnet current can be obtained by the rate of change of the amplitude, of the peak value or the root mean square value of the supporting magnet current or by modulation of the supporting magnet current at a predetermined modulation frequency.

One major advantage of the method according to the invention is that this method can be carried out even at very low vehicle speeds and even when the magnetic levitation vehicle is stationary since—in contrast to the methods that are already known and are described initially—there is no need for the magnetic levitation vehicle to move in order to measure the pole orientation; this is because the invention does not make use of a magnetic flux change resulting from a relative movement between the supporting magnet and the stator windings of the trackside stator, but induction in the stator windings resulting from a change in the magnitude of the supporting magnetic field.

A further major advantage of the invention is that it does not require complex technical devices, because all that is necessary is to measure and evaluate voltage measured values at the stator connections.

According to a first particularly preferred variant of the method, with the magnetic levitation vehicle stationary, the rate of change of the supporting magnetic field which occurs during levitation of the magnetic levitation vehicle is used, in that the induced voltage which is present on the stator connections of the trackside stator during levitation is measured, and the pole orientation angle is determined by means of these voltage measured values. The fundamental idea of this advantageous refinement is that a magnetic levitation vehicle induces a voltage in the stator windings during the levitation process. The supporting magnetic field is formed in the initial phase of this process, with the magnetic flux rising continuously, although the vehicle has not yet been levitated, because the magnetic force is still less than the force from the weight of the vehicle; in consequence, the vehicle can also not yet move in the direction of travel. The voltage system which is induced in the stator windings is accordingly a frozen three-phase voltage system whose phase angle corresponds to the location of the vehicle. This three-phase voltage system, and its effects, can be measured at the connections or terminals of the stator, and can be used to determine the starting pole orientation. It should be noted that the pole orientation can be determined without any further technical facilities on the vehicle and, for example, just by upgraded software in the drive converter, by means of which the trackside stator is driven.

The levitation of the magnetic levitation vehicle is preferably identified from the profile of the induced voltages which are present on the stator connections of the trackside stator. For example, levitation of the magnetic levitation vehicle is deduced when the induced voltage reaches or exceeds a predetermined minimum voltage value for a predetermined minimum time period.

According to a second particularly preferred variant of the method—for example when the magnetic levitation vehicle is moving—the vehicle-side supporting magnet current is modulated with a modulation signal, and an additional modulation supporting magnetic field is thus produced; the induced modulation voltage which is present on the stator connections of the trackside stator as a result of the additional modulation supporting magnetic field is measured, and the pole orientation angle is determined by means of the modulation voltage values. The fundamental idea in this case is that the voltages which can be measured at the connections or terminals of the stator form a three-phase voltage system which is amplitude-modulated with the modulation signal and with the respective pole orientation of the vehicle. The second variant makes it possible to extend the advantages of the first variant as described above (measurement during the levitation of the vehicle) to the stationary levitation operation from rest toward those speeds above which the up-method, as described initially in conjunction with the prior art, can be used. In the case of the second method variant proposed here, the already-known, incremental position-finding of the vehicle, as described in the introduction in conjunction with the prior art, is entirely superfluous for determination of the pole orientation.

The modulation signal is preferably at such a high frequency that no detectable force modulation occurs in consequence in the supporting magnet; on the other hand, the frequency is preferably chosen to be sufficiently low in order to reliably remain below the first resonant frequency of the transfer function of the stator winding of the trackside stator and of the track cable network. By way of example, a suitable frequency range is between 20 Hz and 2 kHz.

A modulation signal which is asymmetric over time is preferably produced; for example, a positive signal component of the asymmetric modulation signal has a different time profile than a negative signal component. This is because, if the modulation signal is an alternating variable with an asymmetric curve profile with respect to the time axis, then the ±180° pole orientation information uncertainty can be overcome, specifically because it is possible to determine whether an increase or a decrease in the supporting magnetic field is being observed at the respective measurement time.

Alternatively or in addition to the use of an asymmetric modulation signal, it is also possible to use a device for time synchronization of the vehicle-side modulation of the supporting magnetic field to the trackside demodulation of the voltage induced in the stator windings.

A further refinement of the method provides that a drive converter which drives the stator can be blocked in specific time intervals if the modulation signals which are induced in the stator windings cannot be observed, or can be observed only poorly, during operation of the drive converter; the pole orientation is then measured in the "switched-off" time intervals.

In order to ensure that the modulation signal does not change the gap between the supporting magnet and the trackside reaction rail when averaged over time, it is considered to be advantageous for the modulation signal to be as follows:

$$\int_0^T Iq(t)\,dt = 0$$

where Iq is the modulation signal and T is the period length of the modulation signal.

The invention also relates to a pole orientation measurement device for a magnetic levitation railroad for measurement of the pole orientation of a magnetic levitation vehicle, having an evaluation device which determines the pole orientation angle between a reference axis of the stator and a reference axis of the magnetic levitation vehicle by means of voltage measured values which relate to the voltage which is present on the trackside stator. A pole orientation measurement device such as this is known from the initially described prior art.

Against this background, the invention is based on the object of specifying a pole orientation measurement device which provides very accurate measurement results even when the vehicle is stationary or the vehicle is traveling at slow speed, and which can nevertheless be produced easily and at low cost.

According to the invention, this object is achieved in that the evaluation device has a data processing device which detects a voltage induced in the trackside stator on the basis of a rate of change of the magnitude of the vehicle-side supporting magnet current and on the basis of the rate of change of the supporting magnetic field, and determines the pole orientation angle by means of the voltage measured values of the induced voltage.

With regard to the advantages of the pole orientation measurement device according to the invention, and with regard to the advantages of advantageous refinements of the pole orientation measurement device according to the invention, reference should be made to the above statements relating to the method according to the invention, since the advantages of the method according to the invention correspond essentially to the advantages of the pole orientation measurement device according to the invention.

The evaluation device is preferably designed such that it detects levitation of the magnetic levitation vehicle when the magnetic levitation vehicle is stationary, measures the induced voltage which is present at the stator connections of the trackside stator during levitation, and makes use of these voltage measured values to determine the pole orientation angle. The evaluation device preferably detects the levitation of the vehicle on the basis of the voltage measured values at the stator connections of the trackside stator.

Additionally or alternatively, the pole orientation measurement device may have a vehicle-side modulation device which is suitable for modulation of the vehicle-side supporting magnet current with a modulation signal, and thus for producing an additional modulation supporting magnetic field.

The invention will be explained in more detail in the following text with reference to exemplary embodiments; in this case, by way of example:

BRIEF DESCRIPTION OF THE SEVERAL VIEWS OF THE DRAWING

The same reference symbols are used for identical or corresponding components in FIGS. 1 to 7, for clarity reasons.

DESCRIPTION OF THE INVENTION

Figure 1:
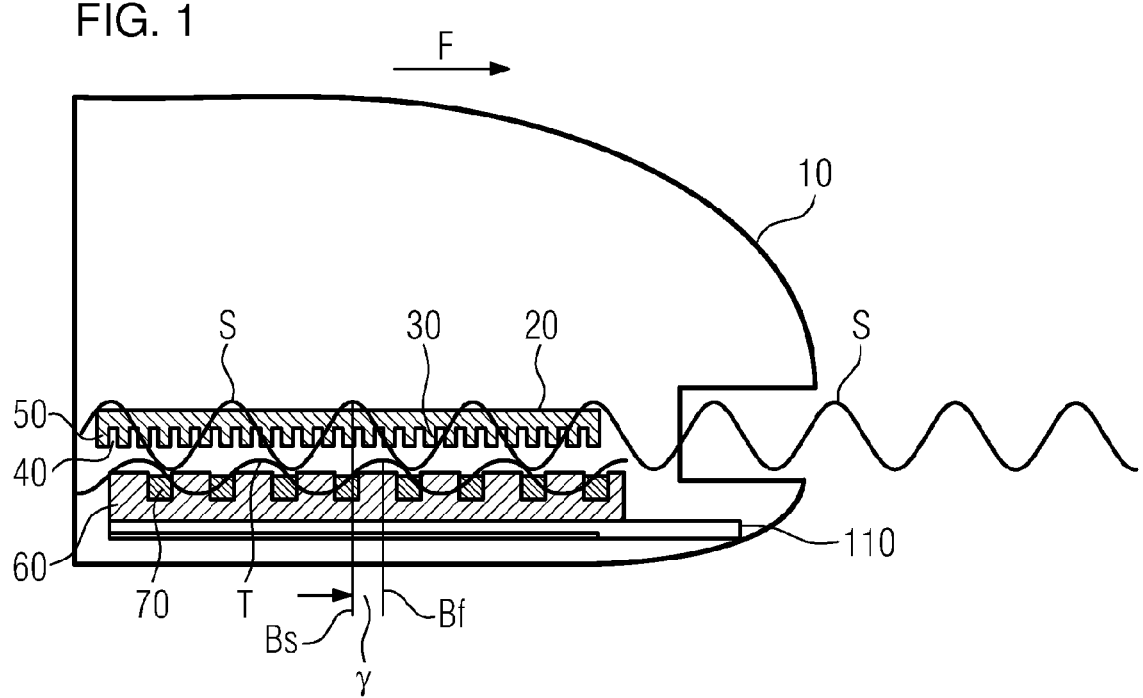
FIG. 1 shows a magnetic levitation vehicle, for general explanatory purposes.

FIG. 1 shows the front area of a magnetic levitation vehicle 10, which is located on a magnetic levitation railroad track 20.

Of the magnetic levitation railroad track, FIG. 1 shows a trackside stator 30, which is equipped with stator slots 40 and stator teeth 50.

Magnet coils, which are not illustrated in any more detail in FIG. 1, are located in the stator slots 40 in order to produce a stator magnetic field. The fundamental of the stator magnetic field is annotated with the reference symbol S in FIG. 1. The arrangement and the orientation of the magnet coils define a magnetic reference axis Bs of the stator 30.

FIG. 1 illustrates only a section of the stator 30; the stator 30 extends over the entire track of the magnetic levitation railroad and thus—as can be seen in FIG. 1—also produces the stator magnetic field S in front of the magnetic levitation vehicle 10.

In addition, FIG. 1 shows a front supporting magnet 60 of the magnetic levitation vehicle 10; this is equipped with magnet coils 70 which produce a supporting magnetic field for levitation of the magnetic levitation vehicle 10. The supporting magnetic field is annotated with the reference symbol T in FIG. 1. The arrangement and the orientation of the supporting magnet 60 define a magnetic reference axis Bf of the magnetic levitation vehicle 10. The supporting magnet 60 is mounted on a support 110.

Figure 2:
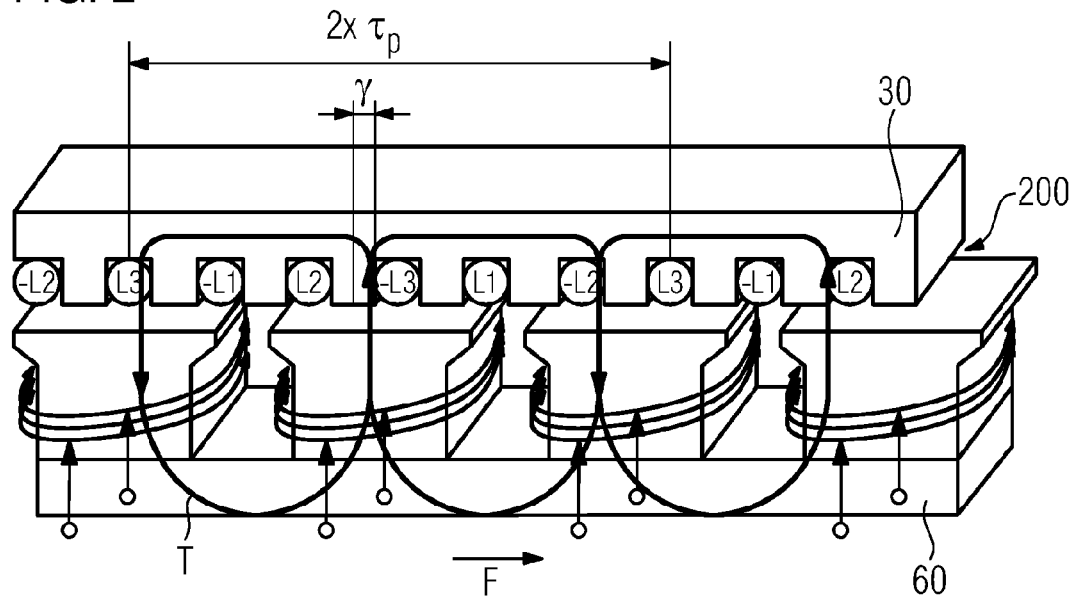
FIG. 2 shows a supporting magnet of the magnetic levitation vehicle, and a stator as shown in FIG. 1, in detail.

FIG. 2 shows the trackside stator 30 and the supporting magnet 60 once again in more detail. This figure shows the stator windings of the stator 30, which are annotated with the reference symbols L1, L2 and L3; the reference symbols L1, L2 and L3 at the same time indicate the association between the stator winding and the respective electrical phase of the three-phase system.

The magnetic flux of the supporting magnetic field is in turn annotated with the reference symbol T. Furthermore, the air gap between the supporting magnet 60 and the stator 30 is marked with the reference symbol 200.

A first exemplary embodiment of an arrangement having a pole orientation measurement device 270 will be explained in the following text in conjunction with FIG. 3; in this exemplary embodiment, the pole orientation is determined with the vehicle 10 stationary, during the levitation process. The pole orientation measurement device 270 is installed exclusively on the trackside.

Figure 3:
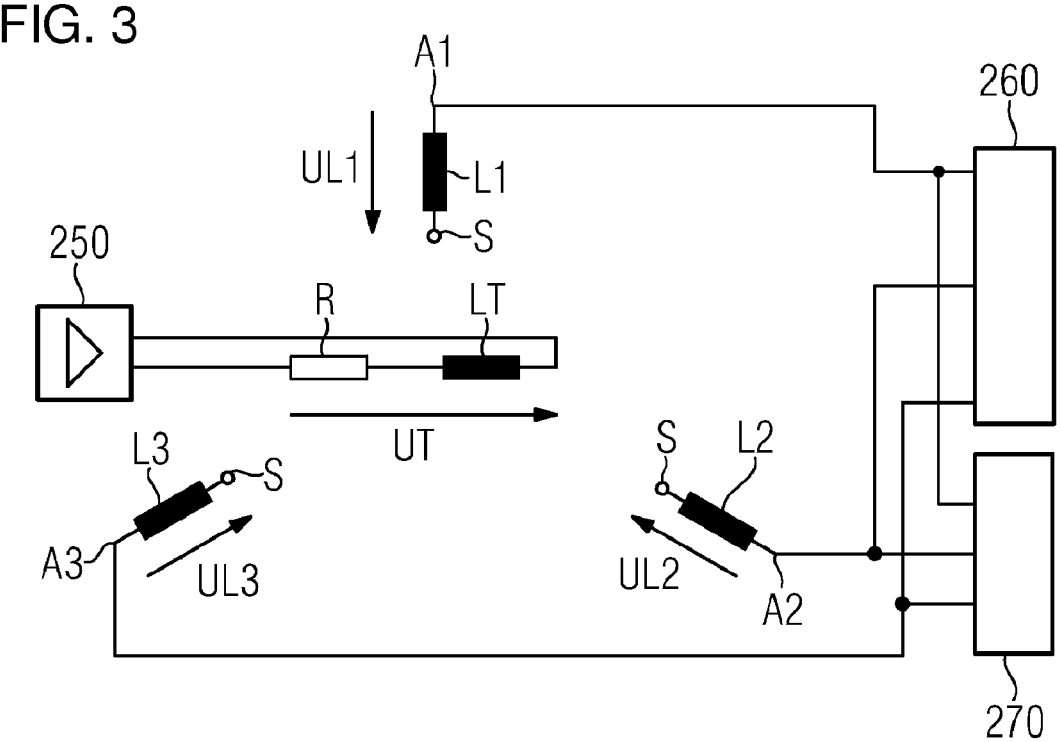
FIG. 3 shows a first exemplary embodiment of a pole orientation measurement device according to the invention, in which the pole orientation angle is determined during levitation of the magnetic levitation vehicle.

FIG. 3 shows an electrical equivalent circuit of the arrangement with the supporting magnet 60, the stator windings L1, L2 and L3 and the pole orientation measurement device 270. The voltages (star-point voltages with respect to the star point S) which are dropped on the stator windings are annotated with the reference symbols UL1, UL2 and UL3. A resistor R is connected in series with the supporting magnet winding LT; the voltage on the supporting magnet winding LT and on the resistor R is marked with the reference symbol UT.

The electrical drive for the supporting magnet 60 is provided by a vehicle-side control device 250. The trackside stator 30 and the stator windings L1, L2 and L3 are driven by a trackside control device 260 which is formed, for example, by a drive converter or contains such a drive converter. The pole orientation measurement device 270 may be entirely or partially integrated in the control device 260; in the exemplary embodiment shown in FIG. 3, the pole orientation measurement device 270 is, instead of this, connected in parallel with the control device 260.

The arrangement shown in FIG. 3 can be operated, for example, as follows:

Before the vehicle 10 has been levitated, it cannot be moved in the direction of travel. The voltage system which is induced in the stator windings is in consequence a frozen three-phase voltage system whose phase angle corresponds to the location of the vehicle. This three-phase voltage system, or its effects, can be measured at the connections or terminals A1, A2 and A3 of the stator 30, and can be used to determine the starting pole orientation.

In general, the magnetic flux (in the stator windings is defined as follows:

Stator winding $L1$: $\Phi1 = \Phi T(t) * \cos(\gamma(t))$

Stator winding $L2$: $\Phi2 = \Phi T(t) * \cos(\gamma(t) - 2\pi/3)$

Stator winding $L3$: $\Phi3 = \Phi T(t) * \cos(\gamma(t) - 4\pi/3)$ where $\Phi L1$, $\Phi L2$ and $\Phi L3$ denote the magnetic flux in the respective stator winding L1, L2 and L3, and where $\Phi T(t)$ denotes the magnetic flux of the supporting magnet 60, and $\gamma(t)$ denotes the pole orientation angle between the magnetic reference axis Bs of the stator 30 and that of the vehicle 10.

The voltage UL1, UL2 and UL3 induced in the stator windings L1, L2 and L3 by a change in the supporting magnetic field T is now as follows:

$$UL1 = P * N * \frac{d\Phi1(t)}{dt}$$

$$UL2 = P * N * \frac{d\Phi2(t)}{dt}$$

$$UL3 = P * N * \frac{d\Phi3(t)}{dt}$$

where P denotes the number of involved poles of the supporting magnet 60 and N denotes the number of turns of the stator windings in each slot and phase.

The induced voltages are now as follows:

$$UL1 = P * N * \left[\frac{d\Phi1(t)}{dt} * \cos\gamma(t) + \Phi1(t) * \frac{d\cos(\gamma(t))}{dt}\right]$$

$$UL2 = P * N * \left[\frac{d\Phi2(t)}{dt} * \cos\gamma(t) + \Phi1(t) * \frac{d\cos(\gamma(t) - 2\pi/3)}{dt}\right]$$

$$UL3 = P * N * \left[\frac{d\Phi3(t)}{dt} * \cos\gamma(t) + \Phi1(t) * \frac{d\cos(\gamma(t) - 4\pi/3)}{dt}\right]$$

As can be seen from the above equations, the induced voltage is composed of two components, specifically a transformational component $$\left[\frac{d\Phi(t)}{dt} * \cos\gamma(t)\right],$$

which is created when the magnetic flux of the supporting magnet changes, and a translational component $$\left[\Phi(t) * \frac{d\cos(\gamma(t))}{dt}\right],$$

which is created when the supporting magnetic field moves relative to the stator 30. As will become clear from the following text, in the case of the method proposed here, the transformational component is evaluated, in contrast to the method according to the prior art, in which the translational component is evaluated.

Since the vehicle 10 is still stationary during the levitation process, the translational component $$\left[\Phi(t) * \frac{d\cos(\gamma(t))}{dt}\right]$$

disappears, as a result of which only the transformational component $$\left[\frac{d\Phi(t)}{dt} * \cos\gamma(t)\right]$$

can be evaluated.

In the initial phase of levitation of the vehicle 10, the supporting magnetic field T is built up, with the magnetic flux ΦT(t) of the supporting magnet 60 rising continuously, but still without the vehicle 10 being able to levitate, because the magnetic force is still less than the weight force of the vehicle.

Figure 4:
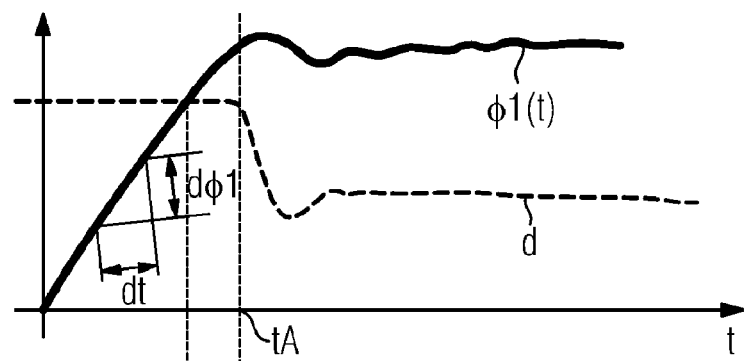
FIG. 4 shows measured-value profiles of the pole orientation measurement device shown in FIG. 3.
Figure 4:
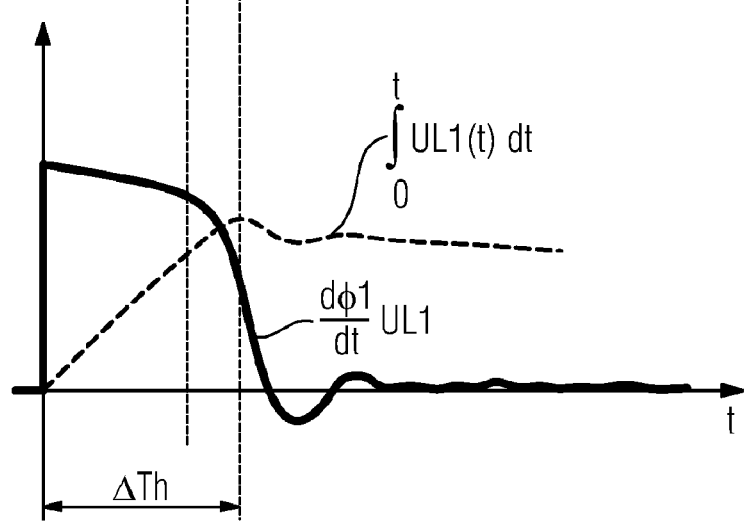

FIG. 4 shows the measured-value profile by way of example on the basis of the stator winding L1 and the voltage UL1. The upper part of FIG. 4 shows the profile of the magnetic flux Φ1(t) and that of the gap d between the supporting magnet and the reaction rail; the lower part of FIG. 4 shows the profile of dΦ(t)/dt, which is proportional to the profile of the induced voltage UL1(t), and the profile of the integrated voltage $$\int_0^1 UL1(t)\,dt.$$

As can be seen, the induced voltage UL1 is approximately constant during the levitation process.

Figure 5:
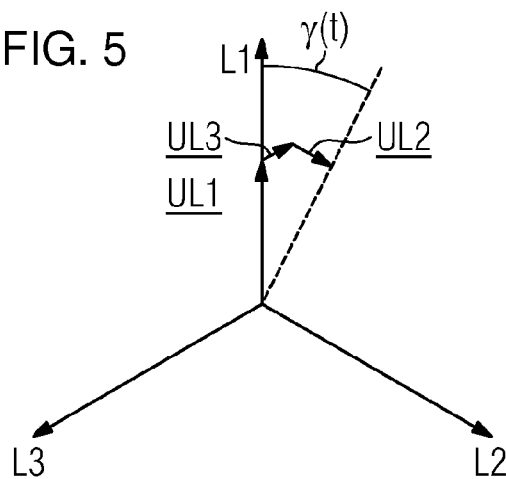
FIG. 5 shows, schematically, the determination of the pole orientation angle on the basis of vector measurement variables of the voltages induced in the stator windings.

If the three induced voltages UL1, UL2 and UL3 are now measured during the levitation process, then the pole orientation angel γ(t) can be determined by computation or by drawing. FIG. 5 shows a drawing solution, in which the voltages UL1, UL2 and UL3 are shown as vector measurement variables UL1, UL2 and UL3. The directions of the vectors are governed by the three-phase system; the magnitudes of the vectors correspond to the measured values for UL1, UL2 and UL3.

Instead of the drawing solution shown in FIG. 5, a computational solution is also possible, as follows:

$$\gamma(t) = f(UL1, UL2, UL3) = a\tan 2((0.86*UL2 - 0.86*UL3)/(1*UL1 - 0.5*UL2 - 0.5*UL3))$$

In this case, as is known, the function a tan 2 should be understood as being the reciprocal function of the angle function tangent, in which, in addition to the quotient tan(x)=sin(x)/cos(x), consideration of the mathematical sign of the numerator results in a validity range from −π to +π, that is to say one complete cycle of the sought angle γ1 is achieved; the function a tan(x) is in contrast defined only in the range −π/2 to +π/2.

Alternatively, an evaluation device for the pole orientation measurement device 270 can initially integrate the phase voltages UL1, UL2 and UL3 measured at the terminals of the stator, and can determine the starting pole orientation from the integration results at the end of the magnetization process. In a corresponding manner, this then results in the following:

$$\gamma(t) = f\left(\int_0^1 UL1(t)\,dt, \int_0^1 UL2(t)\,dt, \int_0^1 UL3(t)\,dt\right) =$$

-continued $$\operatorname{atan2}\left(\left(0.86*\int_0^1 UL2(t)\,dt - 0.86*\int_0^1 UL3(t)\,dt\right)\bigg/\left(1*\int_0^1 UL1(t)\,dt - 0.5*\int_0^1 UL2(t)\,dt - 0.5*\int_0^1 UL3(t)\,dt\right)\right)$$

By way of example, the integration process can be carried out by integrators. A procedure such as this is very robust even when the line lengths are long and with respect to any quantization noise from voltage converters, which are connected to the connections A1, A2 and A3 and produce the voltage values for the pole orientation measurement device.

The start of the levitation process at the time t=0 is preferably identified from the voltage rise on at least one of the stator windings, and is used to reset the integrators which are used for integration. The end tA≈0.6 seconds of magnetization (when the vehicle is levitated for the first time) can be identified from the change in the mathematical sign of the phase voltages. The change in the mathematical sign and the voltage reversal are due to the fact that a levitation regulator in the vehicle-side control device 250 traps the supporting magnet 60, which "flies" with respect to the reaction rail, by voltage reversal, which itself results in a reduction in the current.

It is particularly preferable to not start the integration process until the induced voltage exceeds a predetermined threshold value Umin, in order to prevent the integrator from running up to "infinity". If the threshold value Umin is undershot again during the integration process, then the integration process is ended, and the integration value is used to form the phase angle γ.

Figure 6:
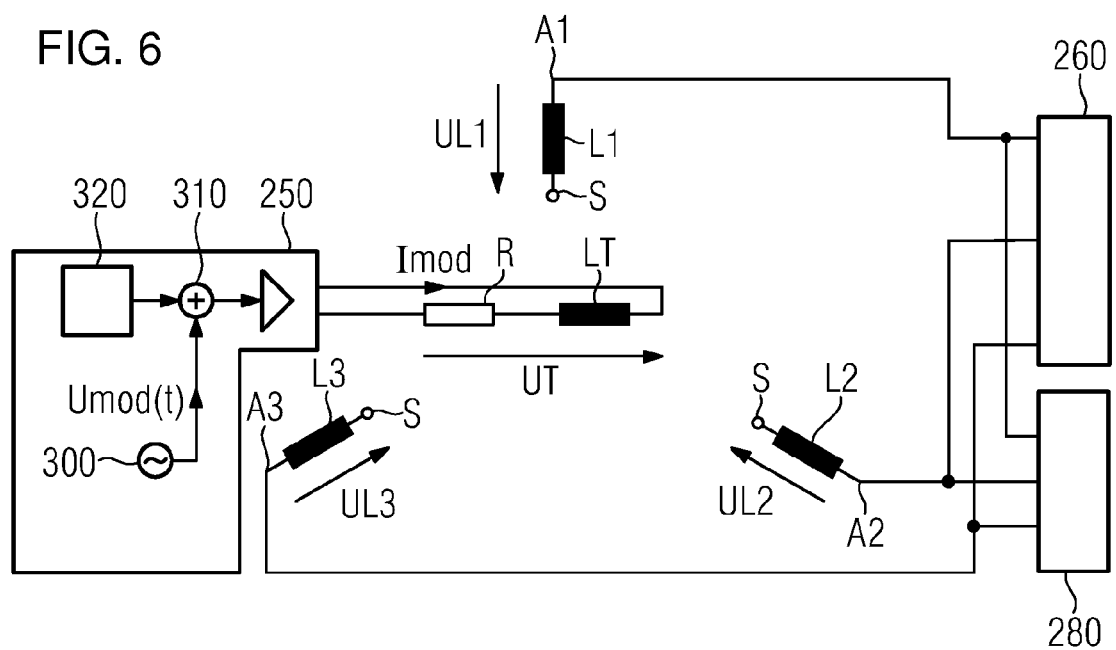
FIG. 6 shows a second exemplary embodiment of a pole orientation measurement device according to the invention with a vehicle-side modulation device.

A second exemplary embodiment of a pole orientation measurement device, by means of which the pole orientation can be determined while the vehicle 10 is moving, will now be explained in conjunction with FIG. 6. The pole orientation measurement device has a trackside evaluation device 280 and—in contrast to the arrangement shown in FIG. 3—additionally a vehicle-side modulation device 300, which is accommodated in the vehicle-side control device 250. The pole orientation measurement device therefore extends to vehicle-side and trackside components.

The modulation device 300 is connected to an adder 310 which is additionally connected to a drive converter 320. The modulation device 300 produces a modulation signal in the form of a modulation voltage Umod(t), which is injected into the supporting magnet 60 via the adder 310 and produces an additional modulation current Imod therein. The modulation voltage Umod is an alternating variable at a modulation frequency fmod which is preferably between 20 Hz and a few hundred Hertz. The modulation frequency is preferably chosen to be sufficiently high that the rail vehicle is not subject to any noticeable deflection in the vertical direction as a result of mechanical inertia; in addition, the modulation frequency should be higher than the AC voltage which is induced in the stator windings by the translational movement of the supporting magnet: at a speed of about 30 km/h, the induced frequency resulting from the movement is about 20 Hz, as a result of which the modulation frequency is higher than this value should be. On the other hand, the modulation frequency should be chosen to be sufficiently low that the electrical and magnetic network still does not produce excessive damping, and the voltage induced in the stator windings remains large enough; the modulation frequency is preferably below the first resonant frequency of the transfer function of the respective stator winding and of the track cable network. In this context, it should be mentioned that, at speeds above about 30 km/h, the up method as described initially in conjunction with the prior art can be used, because the voltage induced by the movement in the stator windings is sufficiently high that there is no longer any need to evaluate the modulation signal in the stator windings.

As has already been explained in conjunction with the first exemplary embodiment, the conductor voltage UL1 is as follows:

$$UL1 = P*N*\left[\frac{d\Phi 1(t)}{dt}*\cos\gamma(t) + \Phi 1(t)*\frac{d\cos(\gamma(t))}{dt}\right]$$

so that the modulation current Imod at the frequency fmod results in the formation of a frequency component ΦT(fmod) in the supporting magnetic flux and a corresponding frequency component UL1(fmod) in the induced voltage UL1; the induced voltage UL1 is therefore amplitude-modulated by the frequency component Φ1(fmod) in the supporting magnetic flux. The frequency component at f=fmod in the induced voltage UL1 can be filtered out, and can be measured separately, with a measured value UL1(fmod) being formed.

Measured values UL2(fmod) and UL3(fmod) are produced in a corresponding manner and relate to the induced voltages in the stator windings L2 and L3 at the frequency fmod.

By way of example, the pole orientation angle γ (t) is then determined by drawing—as shown in FIG. 3—or computationally as follows:

γ(t)=f(UL1(fmod,t),UL2(fmod,t),UL3(fmod,t))=a-tan 2((0.86*Glr(UL2)−0.86*Glr(UL3))(1*Glr (UL1)−0.5*Glr(UL2)−0.5*Glr(UL3)))

Figure 7:
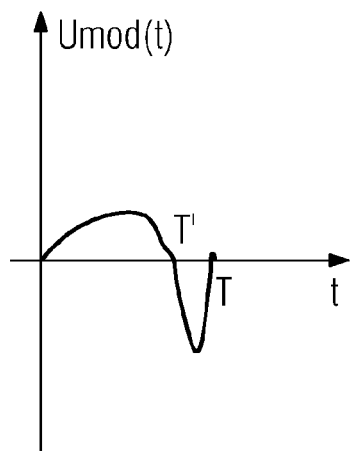
FIG. 7 shows an asymmetric modulation signal of the vehicle-side modulation device as shown in FIG. 6.

Glr(x) denotes a correct-phase rectifier function for the respective signal x; the rectifier function can be described as follows: for example, if a modulation signal Imod as shown in FIG. 7 is used, then the instantaneous value of the signal x during the longer subperiod, which is positive in FIG. 7, of the signal (0<t<T') should be multiplied by "+1" and, during the shorter subperiod (T'<t<T), which is negative in FIG. 7, should be multiplied by "−1". By way of example, this is then followed by a low-pass filter with a cut-off frequency cutoff<fmod, in order to smooth the resultant signal. The cut-off frequency of this low-pass filter is preferably set such that it does not significantly influence the maximum changes to the expected in the signal x as a result of the change in the angle γ to be measured.

If the initially mentioned option of "time synchronization" is additionally used, then the subperiod which follows the synchronization mark is output in a positive form in the vehicle and is multiplied in the evaluation unit by "+1", while the subperiod which follows this is output in a negative form in the vehicle and is multiplied by "−1" in the evaluation unit. The above statements apply in a corresponding manner to the filtering.

The modulation voltage Umod(t) is preferably a pure alternating variable, with an asymmetric curve profile with respect to the time axis; by way of example, FIG. 7 shows one such profile. This is because, if the modulation voltage Umod has an asymmetric profile, it is possible to determine during the measurement of the induced stator voltages UL1, UL2 or UL3 whether the supporting magnetic field is rising or falling; the ±180° pole orientation information uncertainty which occurs when using a symmetrical modulation signal is thus avoided.

In order to ensure that the modulation signal Umod(t) does not change the gap d between the supporting magnet and the trackside reaction rail when averaged over time, the following relationship is preferably complied with:

$$\int_0^T U\text{mod}(t)\,dt = 0$$

where T denotes the period duration of the modulation signal.

Alternatively, a real-time reference or synchronization can also be produced between the modulated supporting magnet current Imod(t) and the induced stator voltages UL1(t), UL2 (t) and UL3(t) so that it is always possible to use the induced stator voltages to determine whether the supporting magnetic field is rising or falling. If a real-time reference such as this is available, it is also possible to use a symmetrical modulation signal instead of an asymmetric modulation signal, without having to accept a ±180° pole orientation information uncertainty.

LIST OF REFERENCE SYMBOLS

10 Magnetic levitation vehicle
20 Magnetic levitation railroad track
30 Trackside stator
40 Stator slots
50 Stator teeth
60 Supporting magnet
70 Magnet coils
110 Support
250 Vehicle-side control device
260 Trackside control device
270 Pole orientation measurement device
280 Trackside evaluation device
300 Vehicle-side modulation device
310 Adder
320 Drive converter
Bs Magnetic reference axis of the stator
Bf Magnetic reference axis of the magnetic levitation vehicle
S Fundamental of the stator magnetic field
T Supporting magnetic field
γ Pole orientation angle
LT Supporting magnet winding
R Resistor
Umod(t) Modulation signal
Imod Modulation current
fmod Modulation frequency
L1, L2, L3 Stator windings
UL1, UL2, UL3 Star-point voltages
A1, A2, A3 Connections
ΦL1, ΦL2, ΦL3 Magnetic flux
ΦT(t) Magnetic flux of the supporting magnet

The invention claimed is:

1. A method of measuring a pole orientation of a magnetic levitation vehicle of a magnetic levitation railroad, which comprises:
   feeding a vehicle-side supporting magnet current into at least one supporting magnet for producing a supporting magnetic field on the magnetic levitation vehicle;
   varying a magnitude of a vehicle-side supporting magnet current and thus varying the supporting magnetic field over time;
   measuring a voltage induced in a trackside stator by a rate of change of the magnitude of the supporting magnetic field for forming voltage measured values; and
   determining from the voltage measured values of the induced voltage a pole orientation angle between a reference axis of the stator and a reference axis of the magnetic levitation vehicle.

2. The method according to claim 1, wherein, with the magnetic levitation vehicle stationary, using the rate of change of the supporting magnetic field that occurs during levitation of the magnetic levitation vehicle, by measuring the induced voltage which is present on the stator during levitation, and determining the pole orientation angle by way of the voltage measured values.

3. The method according to claim 2, which comprises identifying the levitation of the magnetic levitation vehicle from a profile of the induced voltage on the trackside stator.

4. The method according to claim 2, which comprises deducing levitation of the magnetic levitation vehicle when the induced voltage reaches or exceeds a predetermined minimum voltage value for a predetermined minimum time period.

5. The method according to claim 1, which comprises:
modulating the vehicle-side supporting magnet current with a modulation signal, and thus producing an additional modulation supporting magnetic field; and
measuring the induced modulation voltage that is present on the trackside stator as a result of the additional modulation supporting magnetic field, and determining the pole orientation angle by way of the modulation voltage values.

6. The method according to claim 5, which comprises generating a modulation signal that is asymmetric over time.

7. The method according to claim 6, wherein a positive signal component of the asymmetric modulation signal has a different time profile than a negative signal component.

8. The method according to claim 6, wherein the modulation signal is defined as follows:

$$\int_0^T Iq(t)\,dt = 0$$

where Iq is the modulation signal and T is a period length of the modulation signal.

9. A pole orientation measurement device for a magnetic levitation railroad for measuring a pole orientation of a magnetic levitation vehicle, comprising:
an evaluation device configured to determine a pole orientation angle between a reference axis of a stator and a reference axis of the magnetic levitation vehicle by way of voltage measured values relating to a voltage present at a trackside stator;
said evaluation device including a data processing device configured to detect a voltage induced in a trackside stator on a basis of a rate of change of a magnitude of a vehicle-side supporting magnet current and on a basis of a rate of change of a supporting magnetic field, and to determine the pole orientation angle by way of the voltage measured values of a voltage induced in the trackside stator.

10. The pole orientation measurement device according to claim 8, wherein said evaluation device is configured to determine the pole orientation angle by way of voltage measured values which relate to the voltage induced in the trackside stator during levitation of the magnetic levitation vehicle.

11. The pole orientation measurement device according to claim 9, which further comprises a vehicle-side modulation device suitable for modulation of the vehicle-side supporting magnet current with a modulation signal for producing an additional modulation supporting magnetic field.

* * * * *